(12) United States Patent
Hacigumus et al.

(10) Patent No.: US 8,613,004 B2
(45) Date of Patent: Dec. 17, 2013

(54) SYSTEM AND METHOD FOR CLOUD INFRASTRUCTURE DATA SHARING THROUGH A UNIFORM COMMUNICATION FRAMEWORK

(75) Inventors: Vahit Hakan Hacigumus, San Jose, CA (US); Jagan Sankaranarayanan, Santa Clara, CA (US); Junichi Tatemura, Cupertino, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 167 days.

(21) Appl. No.: 13/268,053

(22) Filed: Oct. 7, 2011

(65) Prior Publication Data

US 2012/0144407 A1 Jun. 7, 2012

Related U.S. Application Data

(60) Provisional application No. 61/420,479, filed on Dec. 7, 2010.

(51) Int. Cl.
*G06F 13/00* (2006.01)

(52) U.S. Cl.
USPC ............ 719/328; 709/217; 709/218; 709/219

(58) Field of Classification Search
USPC ............................ 719/328; 709/217, 218, 219
See application file for complete search history.

(56) References Cited

U.S. PATENT DOCUMENTS

| 2011/0261828 | A1* | 10/2011 | Smith | 370/401 |
| 2012/0136936 | A1* | 5/2012 | Quintuna | 709/204 |
| 2012/0296866 | A1* | 11/2012 | Doddavula et al. | 707/609 |

OTHER PUBLICATIONS

Armbrust, M., et al. "A view of cloud computing", Communications of the ACM, vol. 53, No. 4. Apr. 2010. pp. 50-58.
Floreen, P. et al. "Towards a context management framework for MobilLife," Proceedings of the IST Mobile & Wireless Communication Summit, Jun. 2005. (5 pages).
Florescu, D., et al. "Rethinking cost and performance of database systems", ACM SIGMOD Record, vol. 38, No. 1. Mar. 2009. pp. 43-48.
Haciguemues, H., et al. "CloudDB: One size fits all revived," 2010 IEEE 6th World Congress on Services (Services). Jul. 2010. pp. 148-149.
Klein, A., et al. "Access schemes for mobile cloud computing," Proceedings of the International Conference on Mobile Data Management (MDM), May 2010. pp. 387-392.
Rao, L., "The app store now counts 4,870 iPad apps", Apr. 2010. (4 Pages).
Yau, S., et al. "Reconfigurable context-sensitive middleware for pervasive computing" Pervasive Computing, IEEE, vol. 1, No. 3. Jul. 2002. pp. 33-40.
Zhdanova, A., et al. "Context acquisition, representation and employment in mobile service platforms", Proceedings of the IST Mobile and Wireless Communications Summit, Jun. 2006. (5 pages).

* cited by examiner

*Primary Examiner* — Andy Ho
(74) *Attorney, Agent, or Firm* — Joseph Kolodka; James Bitetto (57) ABSTRACT

A system and method are provided for data sharing. A uniform communication framework is provided as part of a sharing service on the cloud platform to facilitate data sharing among a plurality of applications. The uniform communication framework includes an application programming interface which provides a communication gateway to permit a first application to access data of a second application stored in the data store.

19 Claims, 9 Drawing Sheets

SYSTEM AND METHOD FOR CLOUD INFRASTRUCTURE DATA SHARING THROUGH A UNIFORM COMMUNICATION FRAMEWORK

RELATED APPLICATION INFORMATION

This application claims priority to provisional application Ser. No. 61/420,479 filed on Dec. 7, 2010, the entirety of which is herein incorporated by reference. This application is related to co-pending U.S. application Ser. No. 13/268,062, co-pending U.S. application Ser. No. 13/268,074, and co-pending U.S. application Ser. No. 13/268,082, each of which is filed concurrently herewith and herein incorporated by reference.

BACKGROUND

1. Technical Field

The present invention relates to mobile computing services, and more particularly, to a platform to support data sharing among mobile computing applications.

2. Description of the Related Art

A wide variety of mobile applications are currently available on mobile devices. Unfortunately, communication and data sharing among the mobile applications is quite limited. Communication between mobile applications is "adhoc". For example, consider the communication scenario in which Yelp™, the well-known restaurant review application, allows users to post reviews of restaurants using the Facebook™ social networking application. The communication between Yelp™ and Facebook™ applications is facilitated by Yelp™ accessing the public application programming interface (API) for the Facebook™ application.

A major problem with the communication configuration described above is that it is unidirectional and non-scalable. The two applications are both required to add functionalities to be able to allow the Yelp™ application to post reviews via the Facebook™ application. Specifically, the Facebook™ application has to setup an API, while the Yelp™ application has to setup an interface to communicate with the API. Moreover, if the Facebook™ application desired the ability to access or post data to the Yelp™ application, the Yelp™ application would also have to setup an API and the Facebook™ application would have to setup a corresponding interface. Moreover, whenever one of the applications decides to alter or modify the layout of its underlying data, each of the applications would have to adjust their interface to the application accordingly. The overhead associated with setting up and maintaining this adhoc form of data sharing severely limits communication among mobile applications.

The problem becomes much worse when a large number of mobile applications each desire to share with each other. For example, consider the scenario where a hundred applications all wish to communicate with each other. To facilitate communication among the applications, each application would have to setup ninety-nine interfaces in addition to setting up its own API.

SUMMARY

In accordance with the present principles, a system for data sharing includes a data store residing on a cloud platform. The system also includes a uniform communication framework provided as part of a sharing service on the cloud platform to facilitate data sharing among a plurality of applications. The uniform communication framework includes an application programming interface which provides a communication gateway to permit a first application to access data of a second application stored in the data store.

In accordance with the present principles, a method for data sharing includes issuing a data sharing request from a first application via an application programming interface implemented on a cloud platform. The method also includes processing the request to provide the first application with access to data of a second mobile application.

In accordance with the present principles, another system for data sharing includes a uniform communication framework implemented on a cloud platform to facilitate data sharing among a plurality of mobile applications. The uniform communication framework includes a uniform protocol which permits the mobile applications to access underlying data of data owning applications residing on the cloud platform in a uniform manner. The uniform communication framework also includes an application programming interface which is configured to receive data sharing requests from consumer applications using the uniform protocol and provide the consumer applications with access to the underlying data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a mobile platform is provided which enables wide scale sharing among mobile applications. The mobile platform, which may be implemented as part of a cloud infrastructure, includes a uniform communication framework that permits mobile applications to communicate and share data in a consistent fashion. Mobile applications can communicate and share data with each other by issuing requests to a single application programming interface (API) implemented as part of the uniform communication framework residing on the platform. By implementing sharing services at the platform in the cloud, mobile applications can avoid setting up separate APIs for each application in the mobile environment for which data sharing is being sought. Thus, sharing via the uniform communication framework can eliminate, or at least significantly reduce, overhead for mobile applications that share data with other mobile applications.

The mobile platform includes a sharing middleware system to facilitate seamless sharing among the mobile applications. The sharing middleware system includes a sharing negotiation tool which provides support for mobile applications to set up a "materialized shared space" between two or more applications. The materialized shared space permits a mobile application to access and update the underlying data associated with another mobile application. The sharing negotiation tool is an offline component that facilitates a three-way sharing agreement to be reached among an application that shares its data (i.e., a "data owner"), an application which wants access to the underlying data of the data owner (i.e., a "data consumer"), and the platform provider.

The sharing middleware system also includes a capacity planning component which ensures that Service Level Agreement (SLA) guarantees are satisfied, and that sufficient access is provided to all data owners and data consumers. By determining where the underlying data is stored for both data owners and data consumers, the capacity planner can determine how the data is to be organized or reorganized to satisfy SLA guarantees.

A set of complimentary services may be built on top of the sharing middleware system. One particularly advantageous service, referred to as a mobile context service, captures and utilizes parameters associated with a mobile user's physical and virtual environment. The mobile context service may collect data which indicates the time, position, location, situational context, social context, etc. of the mobile user. This information may be gathered from a plurality of different mobile applications. Using this information, a mobile application can determine the context in which the user is invoking the mobile application and make intelligent assumptions in providing information to the mobile user.

Other exemplary services which can complement the data sharing provided by the sharing middleware system may include a recommendation service and a business analytics service. A recommendation service may utilize collaborative filtering to identify mobile users who are similar to each other according to some criteria, and to provide recommendations to the mobile users based on the similarities. A business analytics service may provide information to a mobile application developer to indicate or extract information about their client base, revenue, advertisement targeting, etc. Other services may be provided as well.

While embodiments described herein may be described as facilitating sharing among mobile applications, it should be recognized that the present principles can be applied to permit data sharing for any application residing on a cloud.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
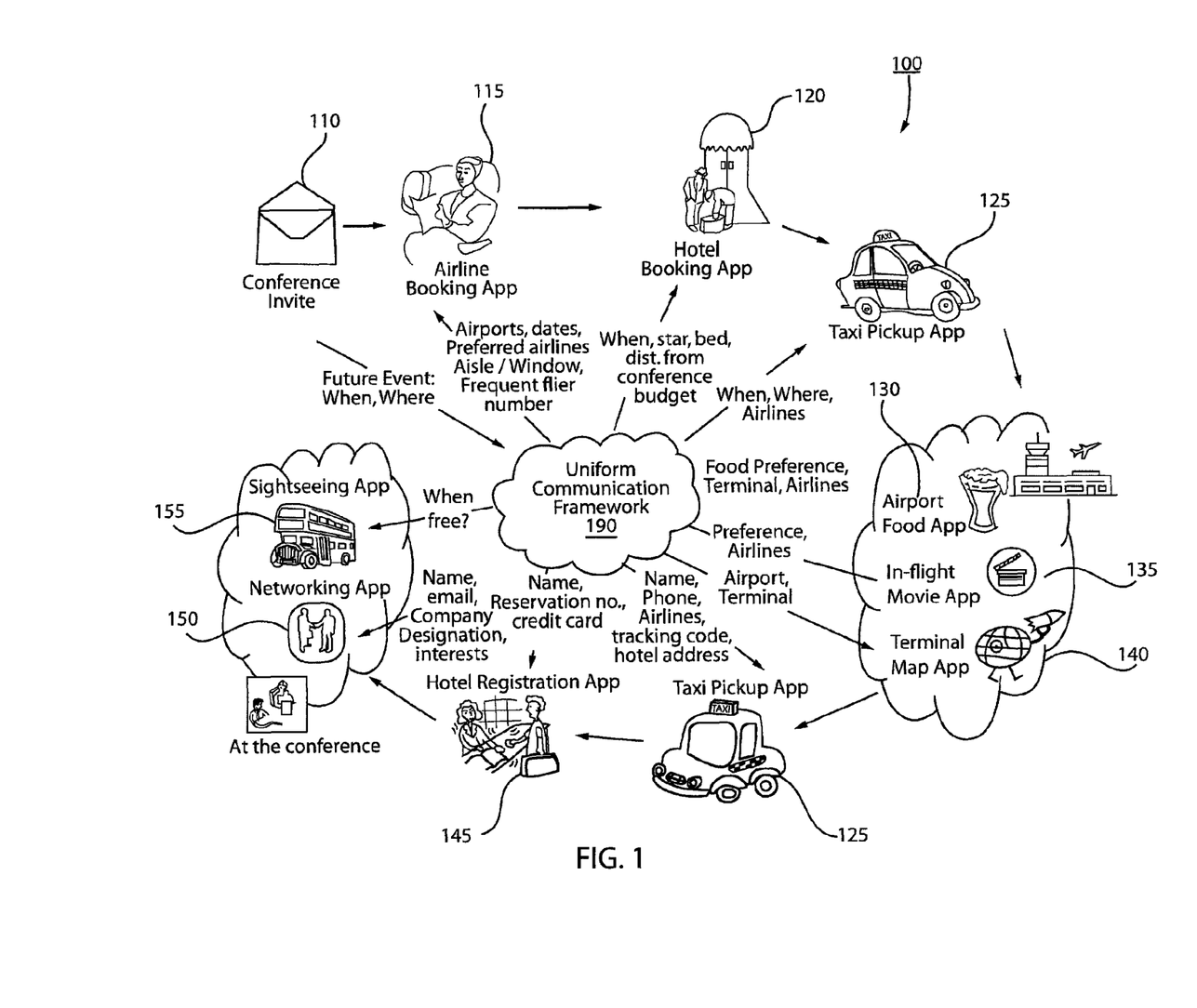
FIG. 1 is a mobile environment which utilizes a uniform communication framework to enable wide scale data sharing among mobile applications in accordance with an embodiment of the present principles.

Referring now to the drawings in which like numerals represent the same or similar elements and initially to FIG. 1, a mobile environment 100 includes a plurality of mobile applications working together to create a seamless mobile experience for a user in accordance with an embodiment of the present principles. The mobile applications communicate seamlessly with each other and share information via a uniform communication framework 190.

The seamless mobile experience of the user starts when the user gets an email with a conference invite. An email application 110 extracts the event information (e.g., date, time and place of the conference) and populates a calendar in the email application 110 with the relevant information. At some point in the future when the mobile user invokes an airline booking application 115 to reserve plane tickets, the airline booking application 115 accesses the event information stored in the calendar of the email application 110. Using this information, the airline booking application 115 may determine the approximate time frame in which the user will be flying, the closest airports for both departing and arriving flights, etc. The airline booking application 115 can then present the user with a number of different flight options which are available around the time of the conference, thus making it simple and easy for the user to select a flight.

The mobile user's interaction with the airline ticket booking application 115 is the first instance of a seamless mobile experience, which was facilitated by the sharing of information between the calendar in the email application 110 and the airline booking application 115 to make the airline reservation process intuitive for the user. Of course, the user may want to fly on different dates, or use different airlines. This can be resolved by providing a suitable user interface which permits the user to alter the dates, the selected airlines or other parameters. Thus, the goal of data sharing between the mobile applications is not to be perfect (which of course would be the ultimate goal if possible). Rather, the present principles aim at providing a data sharing framework in which mobile applications are aware of the context in which the user is invoking the mobile applications.

Continuing with the example in FIG. 1, the user invokes a hotel reservation application 120 to reserve a hotel for the conference. The hotel reservation application 120 obtains information from the calendar in the email application 110 and airline reservation application 115, and tries to present the user with hotel options that are proximate to the conference venue and which are available on the same dates as the conference. For example, the hotel reservation application 120 may extract the flight dates from the airline reservation application 115 to determine the dates that a hotel will likely be needed, and may extract the location of the conference from the calendar to search for hotels in the neighboring area.

Next, the user invokes a taxi reservation application 125 to reserve a taxi ride to the airport. The taxi reservation application 125 obtains the information associated with the pickup (e.g., the drop-off location, time of drop-off, etc.) from the previous mobile applications. When the user arrives at the airport and looks for restaurants to dine, the airport food application 130 presents the user with dining options in the same terminal in which the user is currently located. Optionally, the airport food application 130 may choose to omit particular food options that the user has not preferred, or has indicated a dislike for, in the past.

The user may also utilize an in-flight movie application 135 to select a movie to be viewed during the flight. The in-flight movie application 135 may request the name of the airline from the airline booking application 115 to determine what movies are available by the particular airline. A movie may be selected, or options may be presented to the user, based on the movies which are available by the particular airline and a set of user preferences.

A terminal map application 140 may also be utilized at the airport to view a map (e.g., indicating store and bathroom locations) of the terminal from which the user will be departing. The terminal map application 140 can access the flight information from the airline booking application 115 to determine the appropriate map which should be displayed to the user.

The remaining portions of FIG. 1 follow the same pattern as described above where the mobile applications provide a rich mobile experience to the user by seamlessly sharing information and considering the context in which the user is invoking the mobile applications. For example, the taxi pickup application 125 can once again be used to reserve transportation between the airport and the hotel that was booked using the hotel booking application 120. A hotel registration application 145 can be used to register the user upon arrival at the hotel which was booked using the hotel booking application 120.

At the conference, a networking application 150 can access the user's information from the other applications in the mobile environment 100, and exchange user information with clients, associates, and others at the conference. The user can even utilize a sightseeing application 155 to schedule a tour of the destination at a time which is convenient for the user.

It should be recognized that the seamless mobile experience described with reference to FIG. 1 is provided merely as an example, and can be varied in numerous ways without departing from the scope of the present principles. For example, the present principles are not limited to the particular mobile applications (e.g., hotel booking application 120, the airline booking application 115, etc.) discussed in FIG. 1. In fact, the present principles can be applied to any mobile application. Likewise, the types of information or parameters exchanged in FIG. 1 are not to be construed as limiting. While the example in FIG. 1 involved sharing text-based parameters, it should be recognized that any type of information can be shared between the mobile applications including, but not limited to, images, videos, audio files, executable files, databases, etc.

Figure 2A:
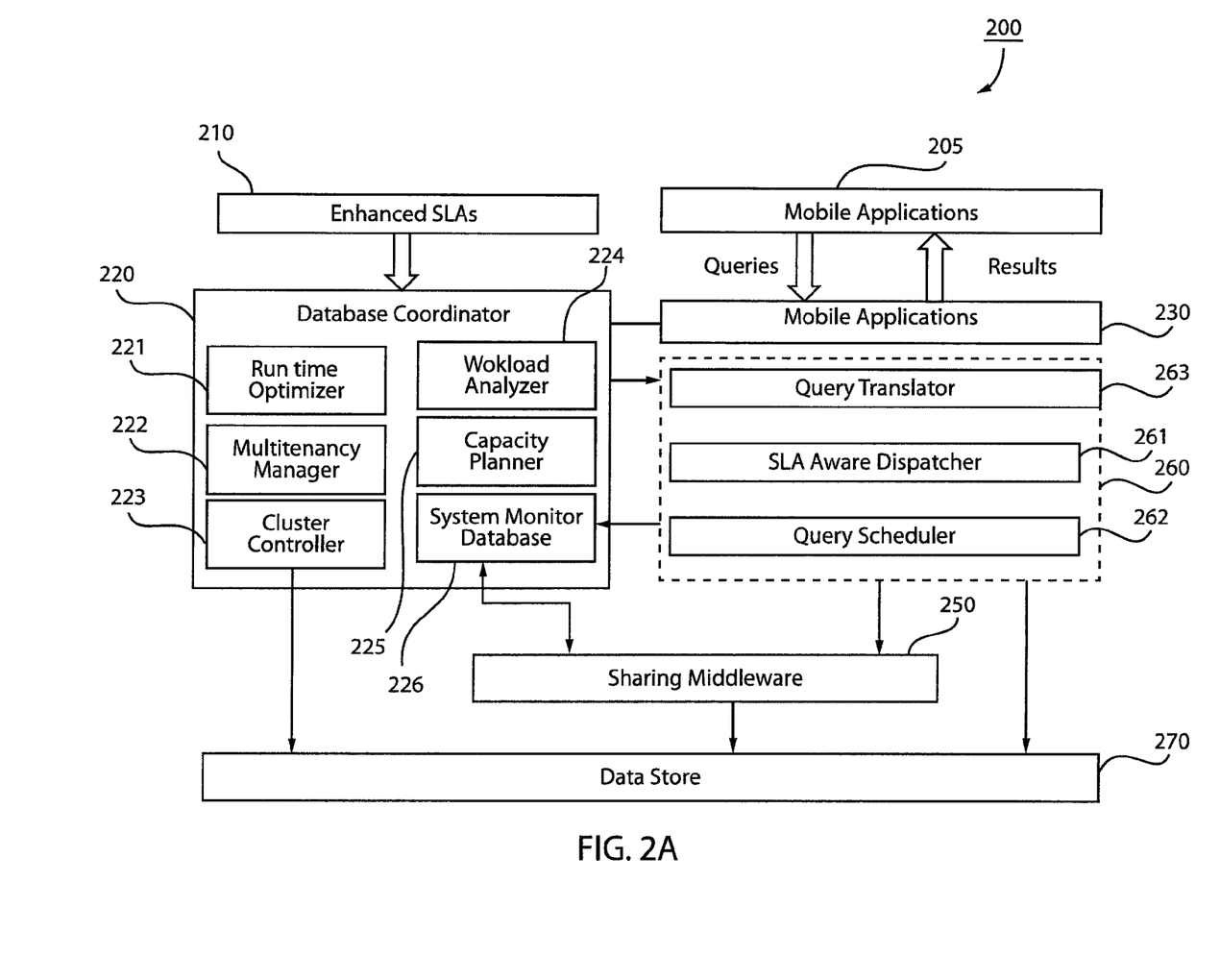
FIG. 2A is a block/flow diagram illustrating a system for enabling wide scale data sharing among mobile applications in accordance with an embodiment of the present principles.

FIG. 2A is a block/flow diagram illustrating a platform as a service (PaaS) system 200 for enabling wide scale sharing among mobile applications in accordance with one embodiment of the present principles.

Mobile applications can be viewed as front-end applications which are driven from remote services that are typically hosted on a cloud. Most applications require several kinds of services to be able to serve the mobile user. For example, a mobile application typically relies on an application store (e.g., Apple™ Application store, Android™ market, etc.) to deploy the front-end of the application on mobile devices as well as to provide support services (e.g., payment processing, download analytics, etc.). Most of the applications also utilize data stores that are hosted remotely on the Internet. In some cases, mobile applications also utilize Software as a Service (SaaS) to provide search tools, map layers, translation tools, etc.

A Platform as a Service (PaaS), e.g., as depicted in FIG. 2A, provides services such as hosting, processing and querying of data for any mobile application that wishes to use its services. Since a PaaS 200 can host data from several different applications, the PaaS 200 is the most appropriate place to build and implement a service for sharing among mobile applications. By implementing sharing services as part of a PaaS 200 (as opposed to implementing sharing services by separately configuring each individual mobile application to interact with another mobile application), communication and data sharing among the applications can be provided as a service with little or no overhead to the applications. Sharing adds value to the parties involved in terms of providing access to richer information about the mobile user.

It may be important to be able to uniquely identify the consumers of the mobile services to ensure that the data associated with the sharing service is delivered to the proper destination. One useful feature that facilitates sharing is the consistent nature in which mobile applications can identify a mobile device or mobile user with a small set of key identifiers (e.g., phone number, device ID or SIM card ID). A single user can be tracked across several different devices using a key identifier. For example, consider a case in which a single user uses multiple mobile devices in different contexts (e.g., a cell phone for work and a cell phone for personal use). The key identifiers associated with each of those mobile devices can be associated with a single user. Thus, using the key identifiers, the PaaS 200 can identify all devices associated with a user and permit sharing among the devices to provide a richer experience to the user.

In a PaaS setting, mobile applications that use the PaaS to host their data are referred to as "tenants." A PaaS system 200 may host several tenants in the same cloud infrastructure (referred to as "multi-tenancy") to provide for good resource usage and spread the operation costs among several tenants.

To ensure that all tenants get reasonable service, tenants may utilize Service Level Agreements (SLA) agreements with the PaaS 200.

In general, a SLA is a contract that describes the level of service provided to a user on the data hosted on a PaaS. For example, a SLA can specify that a tenant pays ten cents for queries responded within 300 milliseconds (ms), while the tenant would penalize the PaaS provider two dollars if the execution time for the query ever exceeded 300 ms. A PaaS 200, whose objective is to maximize profits, ensures that sufficient resources are available so that tenants do not miss their SLA deadlines too often since that results in loss of revenue. A good measure of performance for a PaaS infrastructure is how many queries are answered in a unit time (i.e., throughput), or the profit which is being generated for the PaaS 200. In this context, the PaaS provider is much like a system administrator who ensures the infrastructure operates at its peak throughput.

The exemplary PaaS system 200 illustrated in FIG. 2A is built on top of a cloud infrastructure. The PaaS 200 includes a data store 270, a database coordinator 220 for managing the computing infrastructure, a query processing engine 260 for dispatching and scheduling queries on the data store 270, and a sharing middleware 250.

The sharing middleware 250 provides an infrastructure for mobile applications to actively share data with one another. For example, the sharing middleware 250 can enable sharing between a tenant t, who is the "owner" of the data and another tenant, referred to as a "consumer", who wants access to t's data.

For purposes of simplicity, this description primarily describes the scenario in which the consumer is also a tenant in the PaaS system 200. However, it should be recognized that this need not be the case. That is, the present principles can be applied to provide sharing between a tenant residing on PaaS 200 and a consumer which does not reside on the PaaS 220. For example, this can be accomplished by setting up an interface for the consumer to communicate with the API 230 of the PaaS system 200. Further details regarding the infrastructure and operation of the sharing middleware 250 are described below with reference to FIG. 4.

Mobile applications 205 send requests, updates or queries for information stored in the data store 270 via an API 230 which provides language support for one or more of types of request. For example, referring back to FIG. 1, a mobile application (e.g., a hotel booking application 120 in FIG. 1) may send a request for information collected by another mobile application (e.g., an airline booking application 115). In certain embodiments, the request can represent a Structured Query Language (SQL) query or a Java Database Connectivity (JDBC) query. The API 230 provides a communication gateway which can be accessed by mobile applications 205 in a uniform manner. A single protocol may be utilized by all applications. By implementing a single, uniform API 230 at the PaaS 200, as opposed to setting up separate APIs for each application, a more efficient sharing scheme is provided.

The queries or updates received by the API 230 may be forwarded to the database coordinator 220 and the query translator 263. The database coordinator 220 and associated sub-components collect information about the queries sent by the mobile applications 205. The database coordinator 220 analyzes this information to determine query patterns and to determine an appropriate allocation of resources to satisfy the queries for the mobile applications 205.

A workload analyzer 224 can determine the size of workloads for the tenants and consumers, as well as an aggregated workload for PaaS platform 200. Specifically, the workload analyzer 224 can determine the types of queries which are made for each of these entities, as well as the rate at which the queries are made. The workload data may indicate both current workload data and historical workload data for these entities. This workload information can be useful for performing a variety of different tasks, such as the tasks performed by the capacity planner 225 or the run-time optimizer 221.

The capacity planner 225 performs capacity planning operations which ensure that SLA guarantees are met, and that sufficient access is provided to all tenants and consumers (so long as their workloads do not vary drastically and suddenly). The capacity planner 225 abstracts knowledge indicating where data is stored for both the tenants and consumers, and determines how the data is to be organized or reorganized to satisfy SLA guarantees. The decisions regarding the organization or reorganization of data may be based, at least in part, on the query workload data provided by the workload analyzer 224.

The run-time optimizer 221 determines the order in which queries will be executed during run-time. The scheduling of queries may be based upon certain criteria. In one embodiment, the run-time optimizer 221 optimizes query scheduling in a manner which maximizes throughput (i.e., maximizes the number queries which are answered in a unit time). As explained above, this may also result in maximizing profits for the PaaS system 200.

The database coordinator 220 forwards queries and requests to the query processing engine 260. The query processing engine 260 identifies the information in the data store 270 which the mobile application is attempting to access via the request, and determines whether the mobile application has permission to access the information based on SLA terms associated with the mobile application.

Specifically, the query processing engine 260 comprises a query translator 263, a SLA-aware dispatcher 261, and a query scheduler 262. The query translator 263 can perform distributed operations in the sense that it permits tables from multiple distributed relational databases to be queried as if there were multiple tables in a single database. The query translator 263 turns user queries and data modification commands into a query plan, i.e., a sequence of operations on the database. The query plan identifies the precise information in the data store 270 that is being requested by a mobile application, or which is the subject of an update.

The SLA-aware dispatcher 261 provides access control to the information in the data store 270 based on SLA terms stored in the system monitor database 226. For example, a SLA agreement 210 between a PaaS provider and a consumer may specify an amount of bandwidth that the consumer is to be provided, or may specify that a PaaS provider is to respond to queries by the consumer within a specified time interval. The SLA-aware dispatcher 261 can ensure that these terms are being satisfied.

The SLA-aware dispatcher 261 may also control access to the underlying data in the data store 270. For example, a data owning application may specify that a consumer can access a subset of its data, and may prohibit the consumer from accessing other portions of its data (e.g., credit card information, social security numbers, etc.). To this end, the SLA-aware dispatcher 261 may provide access control by ensuring that the consumer only accesses the appropriate data.

If the SLA-aware dispatcher 261 determines that requests issued by a consumer mobile application are not being satisfied within the sharing terms specified in the SLA agreement 210 between the consumer and the owner, the SLA-aware dispatcher 261 will notify the system monitor database 226.

Otherwise, if SLA terms are being satisfied, the request and associated query plan are forwarded to the query scheduler 262.

The query scheduler 262 implements the actual scheduling of queries for execution on the data store 270. The query scheduler 262 may schedule the queries in accordance with optimization scheme derived by the run-time optimizer 221 to maximize throughput.

The multi-tenancy manager 222 ensures that a few "hard-hitting" tenants or consumers (i.e., tenants or consumers which send queries or receive queries at a high rate) do not terribly affect the performance of all tenants in the system. The multi-tenancy manager 222 can significantly reduce the negative impact of hard-hitting tenants on others by "isolating" the tenants from one another and from the consumers. To isolate tenants and consumers appropriately, the multi-tenancy manager 222 can identify all the tenants and consumers in the PaaS system 200, and communicate with the run-time optimizer 221 to ensure that the run-time scheduling of queries provides a reasonable measure of performance isolation.

The cluster controller 223 controls operation of the underlying servers of the PaaS platform 200. For example, as the demands and workloads of the systems vary, the cluster controller 223 can turn servers on/off, consolidate information on the servers, migrate data between servers, etc.

The seamless mobility and sharing provided by the exemplary PaaS platform 200 in FIG. 2A is facilitated by the sharing and communication framework 190. All applications interface with the platform 200 in a uniform manner, i.e., via the API 230. The sharing middleware 250 provides a suitable framework which permits mobile applications to access each other's underlying data. This type of communication and sharing is far from what currently exists in the state of the art. Despite the fact that a large variety of applications are currently available on mobile devices, the applications generally do not talk to one another, let alone create a seamless mobile experience. Rather, communication between applications is "ad hoc" in the sense that there is no real support to enable these communications. This is demonstrated by the information sharing schemes illustrated in FIGS. 3A-3C.

Figure 3A:
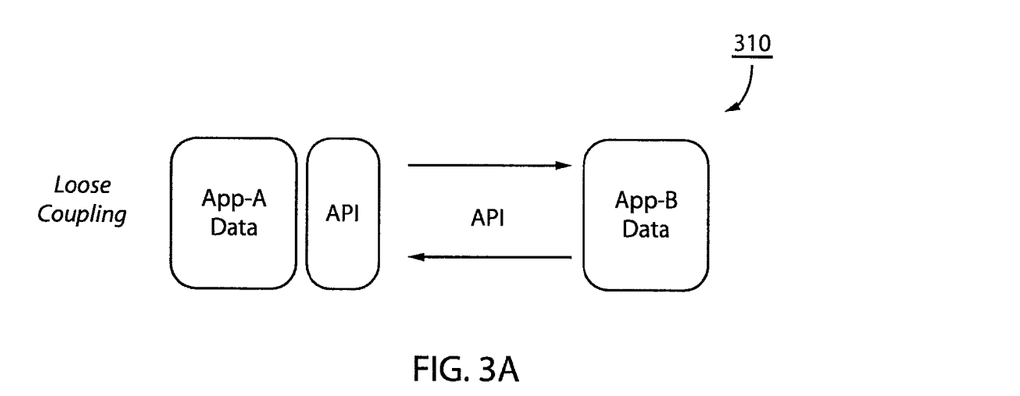
FIG. 3A is a diagram illustrating an exemplary communication scheme between loosely coupled applications.
Figure 3B:
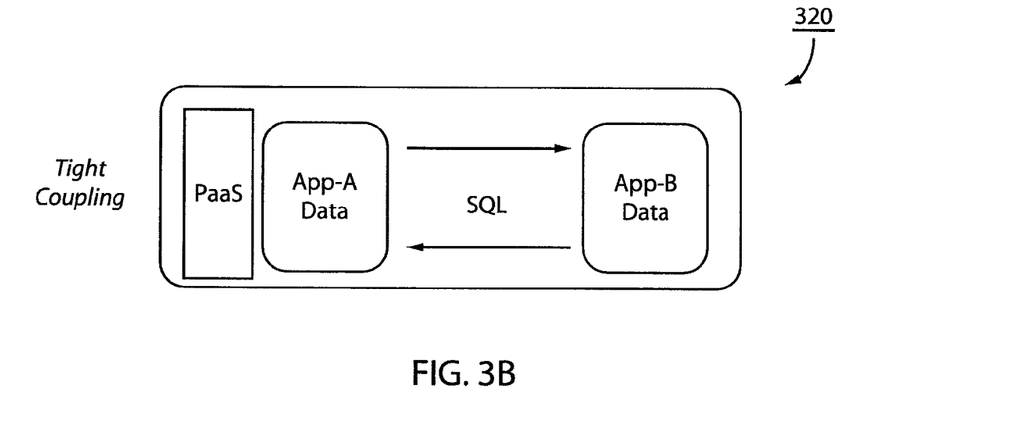
FIG. 3B is a diagram illustrating an exemplary communication scheme between tightly coupled applications.
Figure 3C:
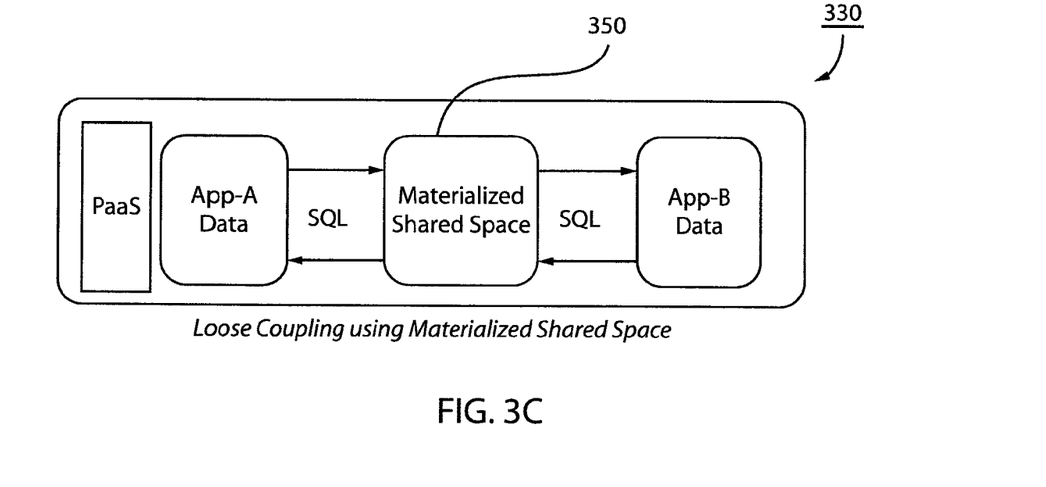
FIG. 3C is a diagram illustrating a communication scheme in which loosely coupled applications utilize a materialized shared space to permit data sharing in accordance with an embodiment of the present principles.

FIGS. 3A, 3B and 3C depict three different scenarios for sharing information among mobile applications. In FIGS. 3A-3C, assume there is information sharing between two applications, i.e., App-A and App-B. Specifically, assume that only App-A, who is the data owner, agrees to share data with App-B, who is the consumer. As an example, App-A may represent a calendar application, while App-B may represent an airline ticket booking service. In order to search for suitable travel deals and provide the present the deals to the user, App-B wants to make use of App-A's information to determine when the mobile user is traveling. FIGS. 3A-3C depict three different scenarios which can provide App-B with access to App-A's data.

FIG. 3A illustrates an information sharing scenario 310 in which App-A is loosely coupled with App-B via an API which has been setup for App-A. In this scenario, an API is created for App-A to share some of its data with App-B. The data made available to App-B is determined by the implementation of App-A's API.

There are several drawbacks with this sharing scheme. First, the two applications both have to add functionalities. That is, App-A would have to add an API to allow access to its data and App-B would have to add an interface to access the data. Each time App-A's underlying data layout is changed (e.g., as the result of updates to the application), the API for App-A would have to be updated. The problem becomes much worse when more than two applications are involved. If k applications want to communicate with one another, each application would have to implement interfaces to k−1 APIs, in addition to setting up its own API.

Another disadvantage of the information sharing scheme 310 in FIG. 3A is that accessing data via an API which has been specifically designed for App-A is an inefficient way for App-B to access App-A's data. This is especially true if both App-A and App-B reside on the same system platform. Even further, App-B may not be satisfied with the access to the data because App-A's API may not be expressive enough for App-B's needs.

FIG. 3B illustrates an information sharing scenario 320 in which the mobile applications are tightly coupled to each other. In this case, App-A permits App-B to access its data directly. App-B can access App-A's data as if it were App-B's own data.

The drawback of this scenario 320 is that it leads to a tight coupling between App-A and App-B in the sense that if App-A changes the layout of its underlying data, App-A has to coordinate these changes with App-B. Thus, in the case where App-A shares with a large number of applications, the appropriate changes would have to be coordinated with each application.

There are other issues with this type of sharing that are specific to a PaaS system (e.g., the PaaS in FIG. 2A). For example, if App-B is a heavy utilizer of App-A's data, this may cause App-A to frequently miss the SLA deadlines on its own data. Similarly, if App-A widely shares its data with several other consumers, the access on the shared data may be exceedingly poor for all the parties involved.

FIG. 3C illustrates an information sharing scenario 330 in which mobile applications are loosely coupled and utilize a materialized shared space 350 to streamline the process of sharing data in the cloud. The sharing middleware 250 (e.g., in FIGS. 2 and 4) preferably implements sharing among mobile applications in accordance with the scenario 330 depicted in FIG. 3C.

In this scenario, the PaaS 200 invests resources (e.g., memory, CPU, bandwidth, network usage, etc.) to ensure that all mobile applications (both owners and consumers) receive reasonable access to data stored in the data store 270. Specifically, the PaaS has setup a "materialized shared space" 350 for App-B, which ensures that App-B's access on the shared space does not significantly affect App-A's queries.

The task of deciding the amount of resources to allocate to the materialized shared space 350 to facilitate sharing may be performed by the capacity planner 225 in FIG. 2A. Capacity planning ensures good access to all the tenants and consumers. Sharing in a multi-tenancy case employs active runtime query scheduling to ensure that there is sufficient performance isolation between the tenants and the consumers in the PaaS.

Figure 2B:
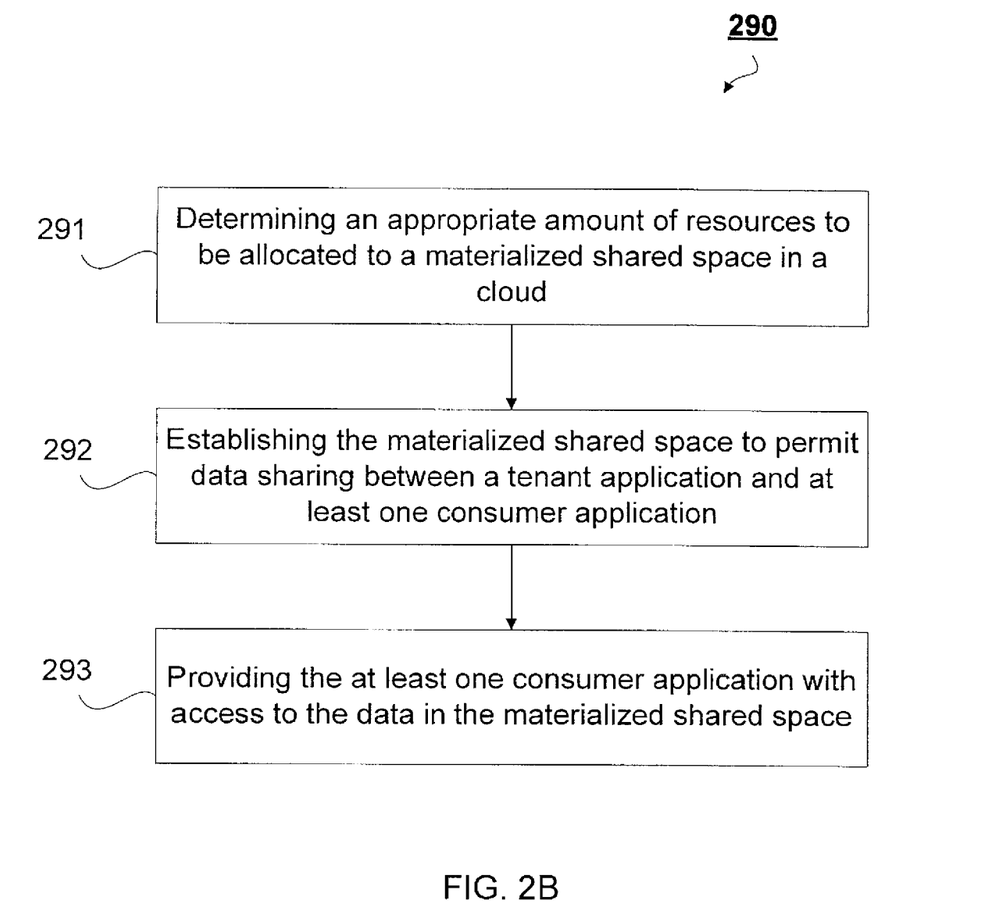
FIG. 2B is a block/flow diagram illustrating a method for enabling wide scale data sharing among mobile applications in accordance with an embodiment of the present principles.

FIG. 2B is a block/flow diagram illustrating a method 290 for enabling wide scale data sharing among mobile applications in accordance with an embodiment of the present principles.

The method begins in block 291 a determination is made regarding the appropriate amount of resources to be allocated to a materialized shared space 350 in a cloud. This decision may be based, at least in part, upon, the workload size of the tenant and consumer applications which are seeking to share data with each other.

Next, in block 292, a materialized shared space 350 is established in a cloud in which the tenant application resides. The materialized shared space 350 includes a set of resources (e.g., memory, CPU, bandwidth, network usage, etc.) allocated by a PaaS to permit data sharing between a tenant application and at least one consumer application.

At least one consumer application is provided with access to the data in the materialized shared space 350 to permit data sharing between the tenant application and at least one consumer application (block 293). The materialized shared space 350 permits the at least one consumer application to view and perform operations on the underlying data of the tenant application (e.g., read the data, perform queries on the data or issue data updates).

Figure 4:
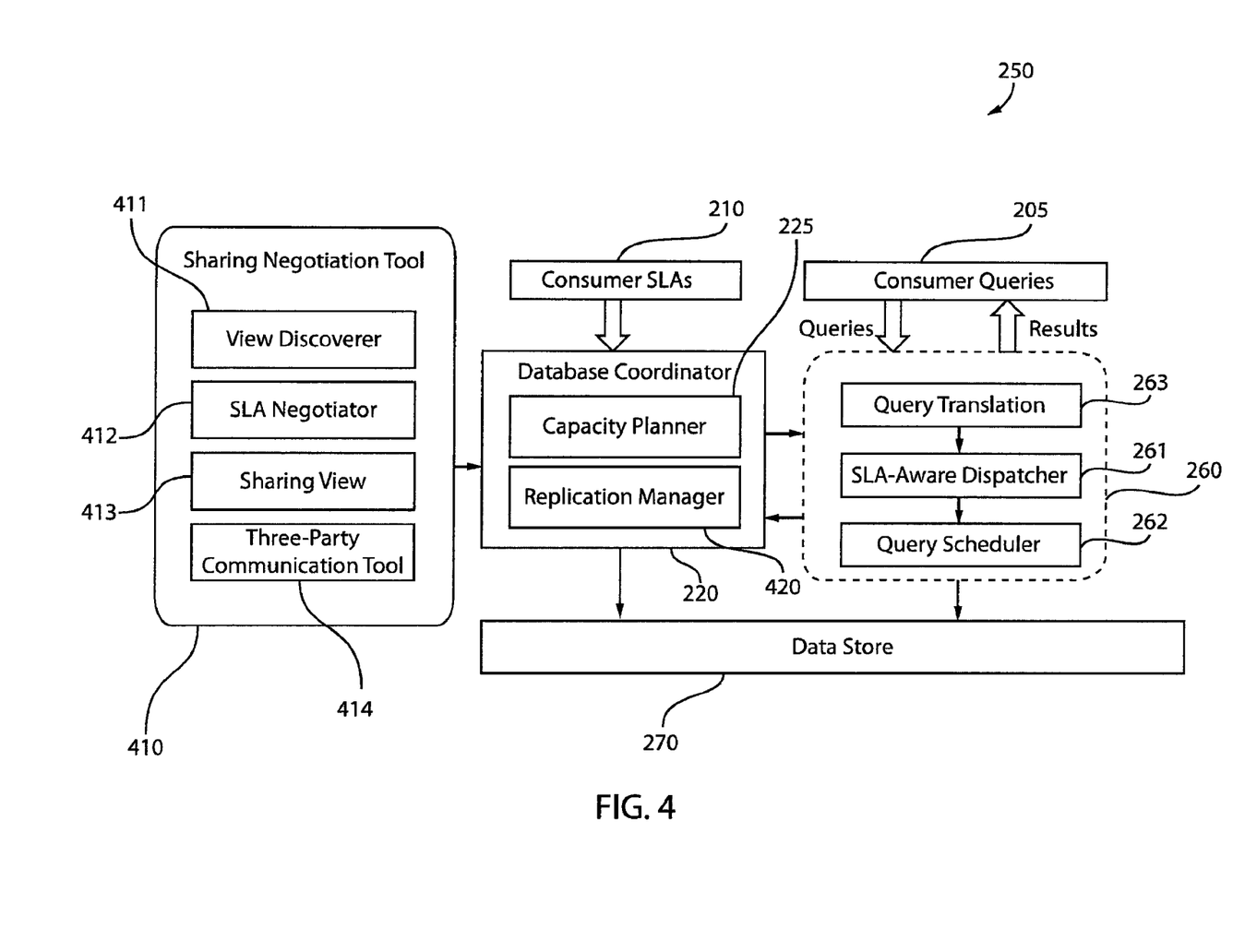
FIG. 4 is a block/flow diagram illustrating a sharing middleware system for enabling wide scale data sharing among mobile applications in accordance with an embodiment of the present principles.

FIG. 4 illustrates an exemplary sharing middleware system 250. For the sake of simplicity, assume that only a data owner can perform updates on the data, and that consumers only have read access on the data. However, it should be recognized that other embodiments of the sharing middleware system 250 may include modifications which permit consumers to update the underlying data of data owning applications. Moreover, it should be noted that while the negotiation sharing tool 410 described herein is described as facilitating sharing between three parties (i.e., a data owner, a data consumer and a PaaS provider), appropriate modifications can be made to allow data owners to setup wide scale sharing of their datasets with any number of owners and consumers.

The sharing middleware 250 includes a sharing negotiation tool 410 which provides support for tenants to set up shared datasets in a materialized shared space 350 (e.g., as depicted in FIG. 3C). The sharing negotiation tool 410 is an offline component that facilitates an agreement to be reached between the data owner, the data consumer and the PaaS provider.

The PaaS provider has in an interest in promoting sharing agreements between the owner and the consumer, since increased data sharing leads to more queries on the PaaS, which in turn leads to more revenue for the PaaS provider. To facilitate data sharing, the PaaS provider may request, or even require, that all tenants wishing to enter into sharing arrangements describe their schema, relations, and attributes. Using this information, the view discoverer 411 can provide a search interface which would permit consumers to search for a dataset matching their needs.

The sharing process usually starts with the consumer requesting access to the data. To do this, the consumer may issue a sharing request to the data owner via the three-party negotiation tool 414. Using the three-party negotiation tool 414, the data owner can respond by denying the request, or respond by identifying a subset of data that the owner would be willing to share with the consumer.

To streamline communication between an owner and a consumer, the owner may be permitted to set flags which indicate a particular portion or subset of data which is available for sharing, as well as the data which is not be available for sharing under any circumstances. The data for which the owner has not indicated a preference can be left open for negotiation. In particular, the consumer and the owner can go back and forth, until they both agree on a sharing arrangement. Furthermore, in certain embodiments, a data owner can provide standard access templates via the negotiation sharing tool 410 to any consumer wanting access to the owner's data.

The role of the PaaS provider during this initial negotiation process is a passive one. Usually, sharing between an owner and consumer involves additional investment to the computing infrastructure. Thus, during this initial part of the negotiation process, the PaaS provider can utilize the three-party negotiation tool 414 to offer incentives and helpful suggestions to the owner and consumer in order to ensure that a sharing arrangement is reached.

The sharing negotiation tool 410 provides for data sharing under several levels of granularity. For example, the owner can share an entire database, a few relations, or even a few attributes spread across several relations. To enforce restrictions on data sharing, the SLA-aware negotiator 261 can implement access controls on the shared data. For example, access controls can be placed on the tuples of the shared relations to restrict attribute ranges would be available to the consumer. Thus, if a consumer attempted to access restricted information that falls outside the shared attribute range, the SLA-aware dispatcher 261 would identify the request and prohibit the query from being executed on the data store 270.

Once the owner and consumer have reached an agreement as to the data which is to be shared, the SLA negotiator 412 can be utilized to negotiate a SLA with the consumer, as well as to negotiate performance isolation policies with the data owner. The SLA agreement between the PaaS provider and the consumer can specify the level of service that the consumer expects to receive on the data. There may be a few standard SLA templates that the PaaS would make available to consumers. As the consumer chooses a SLA on the shared space, the PaaS provider can ensure that the SLA just negotiated with the consumer is satisfied in the face of SLAs negotiated with other consumers and data owners. To make this decision, the PaaS provider may consider the query workload on the shared data, as well as performance isolation policies requested by the data owner.

After these SLA and isolation policy negotiations have been settled, the PaaS provider creates a materialized shared space 350 for the consumer to access the data being shared by the owner. The materialized shared space 350 may include a block of memory storage which is reserved by the PaaS provider to permit sharing between the tenant and consumer. For example, the PaaS provider may determine the data which is to be shared by the data owner, and copy this information to a block of memory which is accessible by the consumer or consumers who have entered into an agreement with the PaaS provider.

A sharing view 413 of the materialized shared space 350 permits the consumer to view and perform operations (e.g., issue queries) on the shared datasets. The sharing view 413, which is exposed as a schema with relations and attributes, may not have any bearing on how the data is actually mapped to the owner's schema. Rather, the sharing view 413 may present the owner's data to the consumer in a manner which is customized by the consumer. Consumers may be permitted to stitch attributes together from multiple relations, as well as other data reorganization operations, to form their own virtual view of shared data. Of course, not all combinations of the attributes are valid. For example, it may be prohibited to put together two attributes that do not have a common primary key. The query translator 263 of the query processing engine 260 enforces these constraints.

The sharing view 413 presented to the consumer ensures that access to a relation or attribute in the sharing view 413 is mapped to the correct database and associated relations. This would not be a hard problem if the sharing view is a static one. However, this is not the case since the PaaS 200 constantly reorganizes data in trying to accommodate new tenants and consumers. As a consequence of this type of dynamism, the sharing view 413 has to keep abreast with the latest configuration of the data in the PaaS 200 to ensure that queries made on the sharing view 413 by the consumer are mapped correctly.

The capacity planner 225 can determine the appropriate type, size and amount of resources (e.g., size of memory reserved, reserved CPU utilization, etc.) that should be allocated to setup a materialized shared space 350 in accordance with the SLA terms. Recall that all tenants in the PaaS 200 can negotiate a client-based SLA on their dataset, while consumers negotiate a shared SLA on the sharing view 413. The primary challenge faced by the sharing middleware 250 in this scenario involves maintaining multiple shared SLAs on a sharing view 413 in view of the various client SLAs on the data. It is conceivable that there can be tens, hundreds, or even more of SLAs on a single sharing view 413. The capacity planner 225 can employ a number of different measures to ensure that SLAs on the shared data are fulfilled.

In one embodiment, the PaaS provider abstracts the knowledge of where the data is stored from both the tenants and consumers. Using this information the PaaS provider can reorganize the data without having to work in coordination with the tenants and consumers. Moreover, the PaaS provider has in its disposal the query workload of tenant and consumers of a dataset. This means that the PaaS provider has an idea of what types of queries would be made against the materialized shared space 350, as well as the rate at which the queries would be made. Of course, this prior knowledge of queries may not account for fluctuations in the workload. However, the capacity planner 225 can utilize this prior knowledge to perform capacity planning and determine how the datasets are to be organized or reorganized.

To implement measures which account for the situation in which datasets may be accessed by hundreds or even thousands of hard hitting consumers, the PaaS provider may forsake some of the ACID properties (i.e., atomicity, consistency, isolation, durability) on the shared data to ensure access. This may only be possible in the case where the consumers using the sharing view 413 are not overly sensitive to those ACID properties that are being sacrificed.

There are several strategies that sharing middleware 250 can employ when a dataset has several consumers with different SLA specifications. All these approaches take into account the trade-off between expending more storage to obtain increased throughput (i.e., the number of queries that can be made against the dataset in a unit time).

In accordance with one embodiment, if a static shared dataset (i.e., a dataset which does not change) is heavily accessed by several hard hitting consumers, the replication manager 420 can replicate the dataset. If the dataset has two identical copies on two different computing resources, it is possible to get double the throughput on the data. In some cases, it may be preferable to only replicate a subset of the shared dataset (e.g., only replicate a few relations, attributes, indices, or selected ranges of tuples from a few relations).

In certain scenarios, replication is not such an attractive option. For example, if a large quantity of updates is made against the data, it would be expensive for the sharing middleware 250 to keep both replicated copies consistent. Moreover, as the number copies of the dataset increase, the cost of keeping them consistent also increases considerably.

The sharing middleware 250 makes use of the replication manager 420 to maintain several asynchronous, replicated copies of datasets or portions of datasets. The replication manager 420 replays transaction logs from one copy on to the other, thereby creating and maintaining consistent copies. Of course, there is a small delay before an update made on one database is propagated to the other copies. This delay does not affect most applications.

However, for some applications (e.g., banking applications) this short-lived inconsistency between copies may not be acceptable. To handle this problem, one copy of the data (i.e., the master copy) can be used to perform all updates, while the other copies (i.e., the slave copies) are replications of the first one obtained by replaying the logs from the master copy on to the slave copies. Critical queries that cannot tolerate inconsistencies, can be given preferential access to the master copy, while the queries that are tolerant of inconsistencies can utilize the slave copies. This type of dynamic query scheduling can be handled by the query scheduler 262 by providing the query scheduler 262 with information indicating the specific application needs.

Figure 5:
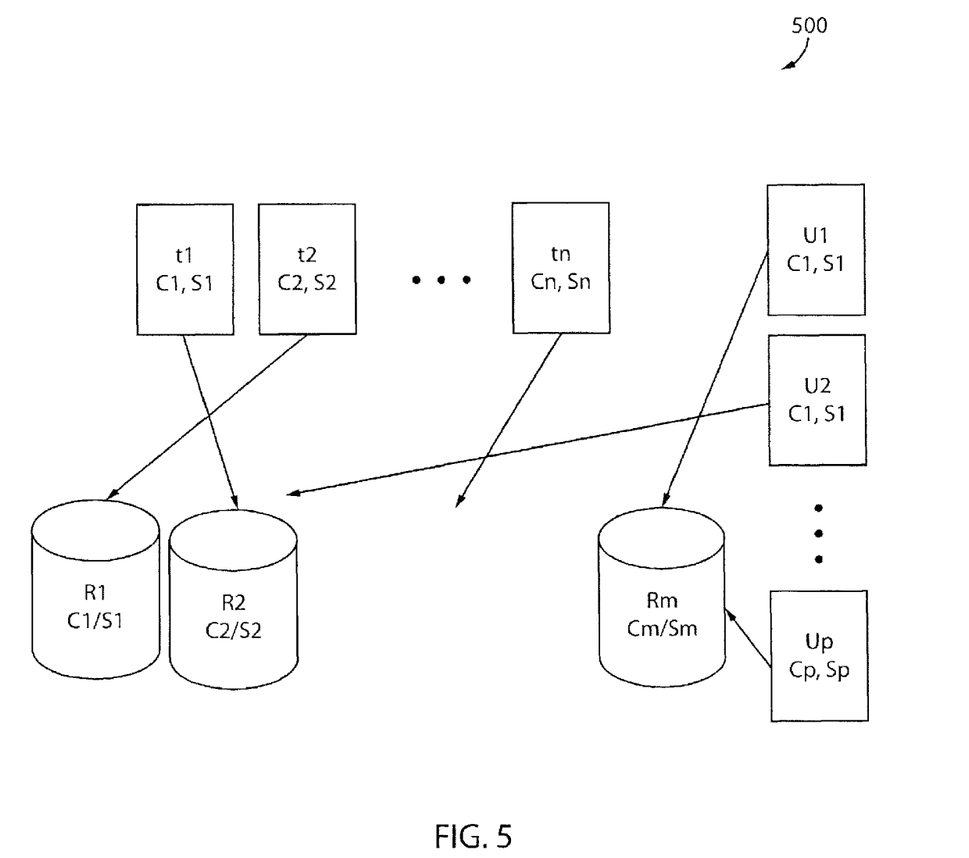
FIG. 5 is a diagram illustrating problems addressed by the sharing middleware system depicted in FIG. 4.

FIG. 5 illustrates particular issues which are accounted for by the sharing middleware 250 to provide for sharing between mobile applications. The capacity planning problem can be defined as follows. Assume that the PaaS infrastructure includes m computing nodes $R_1 \ldots R_m$. A node $R_i$ has a computing capacity of $C_i$ and a storage capacity of $S_i$, such that computing and storage capacities are expressed using some suitable measure. Note that such a description of the computing resources in a cloud represents an over-simplification of the problem. However, it is sufficient to expose the complexity of the sharing problem.

Assume that $T=\{t_1 \ldots t_n\}$ is the set of n tenants, such that $d_i$ is the database of tenant $t_i$, which needs storage $s_i$ as well as $c_i$ computing resources. Further assume that a database $d_i$ is assigned to the computing node $R_j$ using a suitable method. Let $DB(R_i)$ be the set of databases that are hosted on $$R_i \cdot CP(R_i) = \sum_{i=1}^{|DB_{(R_i)}|}$$

is defined as the capacity consumption of $D_i \in DB_{(R_j)}$. Similarly, $$SZ(R_i) = \sum_{i=1}^{|DB_{(R_i)}|}$$

is defined as the storage consumption of $D_i \in DB_{(R_j)}$. For the proper functioning of the PaaS infrastructure, there is $\wedge i \in 1 \ldots, m$, $CP(R_i) \leq C_i$ and $SZ(R_i) \leq S_i$. In other words, the size of the databases and computing resources consumed should not be more than what is available at a node. Note that even such a simple formulation of assigning tenants to computing resources is a NP-hard problem as it can be abstracted to the "bin packing" problem.

Consider a live PaaS system where all the databases have been assigned to computing resources. Now, two tenants in the system enter into a sharing arrangement. This means that the PaaS provider may have to reassign some of the databases to accommodate an additional consumer in the infrastructure. Let us assume that tenant $t_i$, which is currently hosted in $R_j$ has a new consumer $u^{t_i}$, such that it consumes a computing capacity of $c^{t_i}$. If the addition of consumer u overloads the computational capacity of $R_j$ (i.e., $C(R_j)+c^{t_i}>C_j$), then $D_i$ has to be replicated on another resource, which consumes a storage capacity of $s_i$ as well as a small computing overhead in order to maintain both the copies in an consistent manner. If tenant $t_i$ can tolerate a small downtime of its database, then we could simply migrate $D_i$ to another computing node $R_j$.

In some cases, the schema of $D_i$ may not be so conducive for a consumer $u^{t_i}$. The problem of accommodating $u^{t_i}$ is not as simple as finding another computing node that has enough space to accommodate $D_i$. In some cases, if no node exists which can accommodate $D_i$, multiple databases may have to be migrated before $D_i$ can be assigned to a computing resource. In any case, all of the above formulations of the problem are a variant of "online bin packing," which is also known to be NP-hard. As an alternative, heuristic based solutions can be used at every step, but they may lead to non-optimal solutions which progressively get more and more suboptimal as consumers are added to the PaaS.

Now, consider the problem of run-time optimization of queries in the PaaS system. Look at one computing node $R_i$, which hosts databases $DB(R_i)$. Assume that there is only one copy of the database (i.e., no replication) for the sake of simplicity of the query scheduling problem. Let Q denote the set of queries that are currently waiting to be processed on DB $(R_i)$. Let $Q_i \in Q$ be an input query with an SLA of $SLA_i$, such that $PR(SLA_i)$ is the profit in executing within $TI(SLA_i)$ time. It is assumed that $R_i$ can only process one query at a time. Therefore, it needs to be determined which query $Q_i$ in Q is to be executed next in order to maximize profit.

Consider a simple case, where a greedy strategy fails. Suppose two queries $Q_i$, $Q_j \in Q$, such that $PR(SLA_i) > PR(SLA_j)$ and $TI(SLA_i) > TI(SLA_j)$ are waiting to be processed. A greedy approach would try to schedule $Q_i$ before $Q_j$ as $Q_i$ results in more profit, but it may cause $Q_j$ to miss its SLA deadlines. However, it may be that $Q_i$ could be executed before $Q_j$, while ensuring that both $Q_j$ and $Q_i$ do not miss their SLA deadlines, which would bring more profit to the PaaS provider. Hence, the problem of run time scheduling of queries is inherently NP-hard as it can also be cast as variants of the bin-packing problem.

Sharing brings about another layer of complexity to an already hard problem, which makes the architecture of the sharing middleware 250 an interesting technical challenge. Consider once again the sharing relationship between App-A and App-B as described above with reference to FIGS. 3A-3C. The sharing middleware 250 may implement one of the following policies to handle queries from consumers vis-a-vis tenants.

(1) Consumers are Equal Policy: App-A does not need the PaaS 200 to treat consumer queries any differently from how its own queries are scheduled. In other words, App-A relies on its SLA with the PaaS 200 to ensure that it would have good access to its own data.

(2) Consumers Always Next Policy: App-A could have consumers of App-A (like App-B) not affect access on the data of App-A. This means that if App-A and App-B's queries are waiting for access to a resource, App-A relies on the PaaS 220 to ensure that none of its queries miss SLA deadlines due to App-B's queries.

(3) Consumers Always Last Policy: App-A could demand an even higher level of service in the sense that it could stipulate that none of its queries miss their SLA dead-lines due to any other consumer, even if the consumer is not in a sharing arrangement with App-A. In this scenario, the PaaS 200 may invest more resources in order to provide this performance isolation.

If tenants and consumer queries are viewed the same (i.e., Consumers are Equal Policy), then scheduling queries in this case is not different from the formulation of the problem discussed above. However, suppose that a tenant is guaranteed that sharing would not cause any of their queries to fail (i.e., Consumers Always Next Policy). In particular, $Q_i$ is the query from a tenant $t_i$ and $Q_j$ is a query from the consumer of $t_i$, such that both $Q_i$ and $Q_j$ are in Q. In this case, the above policy is satisfied (1) if $Q_j$ is scheduled after $Q_i$, (2) if $Q_j$ is scheduled after $Q_i$ provided $Q_j$ is guaranteed to meet the SLA requirement as well, or (3) if $Q_j$ is executed when $Q_i$ is guaranteed not to meet the SLA deadline regardless of whether $Q_j$ is executed or not. The "Consumers Always Policy" stipulates that consumer queries are executed only if it does not affect the execution of a tenant. This would be similar to the second policy, except for the fact that $Q_j$ can belong to any consumer in the system.

Figure 6:
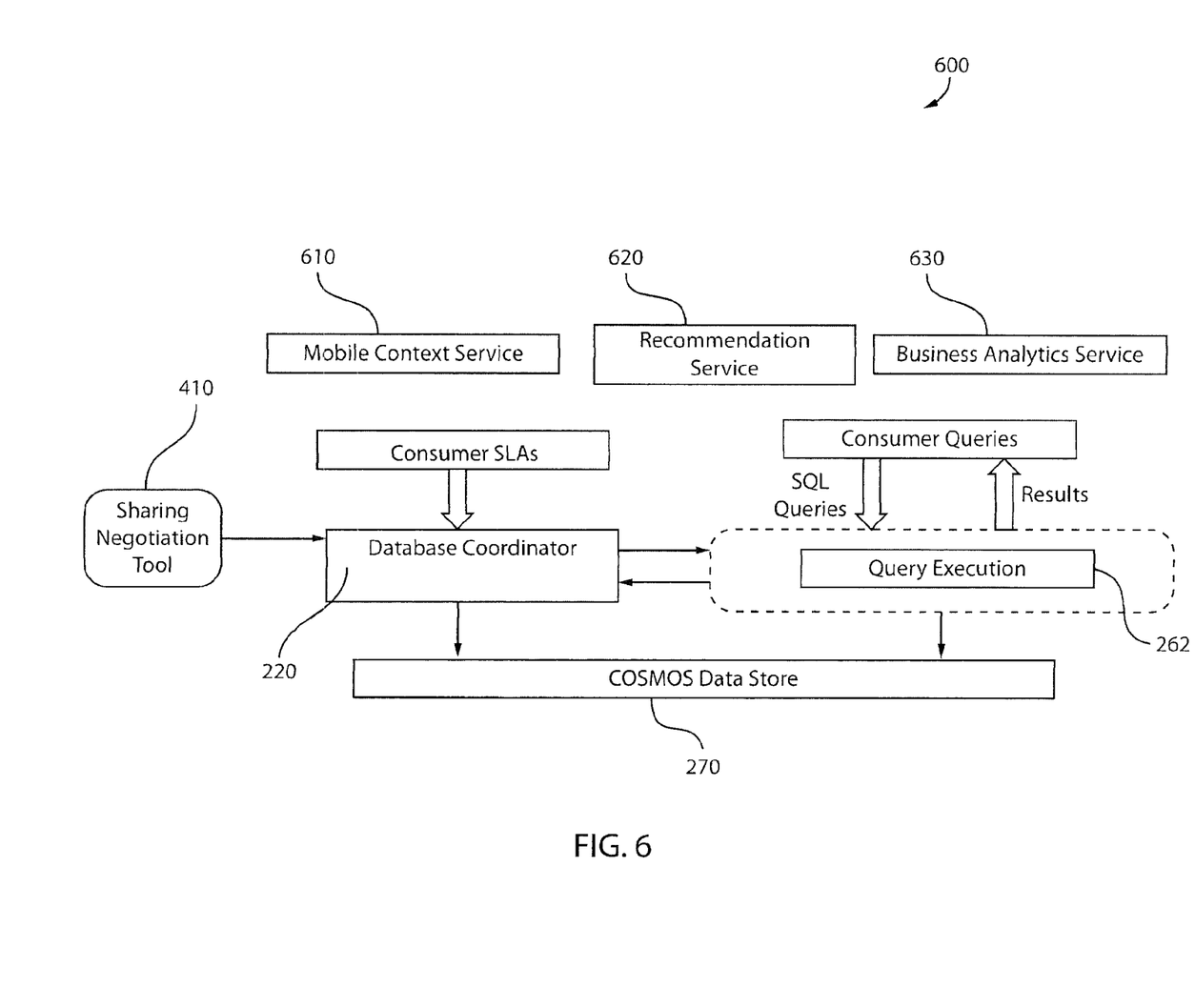
FIG. 6 is a block/flow diagram illustrating a system that includes supporting services to enhance data sharing among mobile applications in accordance with one embodiment of the present principles.

FIG. 6 is a block/flow diagram illustrating a PaaS system 600 that includes a set of supporting services in accordance with one embodiment of the present principles.

As explained above, providing a scheme which provides for sharing among mobile applications hosted on a PaaS 600 can create a seamless mobile experience for the mobile user. Furthermore, the sharing middleware 250 will create many opportunities for various SaaS offerings to be built on top of the PaaS to provide further support for the mobile applications. FIG. 6 illustrates three exemplary SaaS offerings which may be used to support the sharing middleware 250. Each of these is described below.

The first service is a mobile context service 610. The "mobile context" of a user can generally refers to a "rich information vector" that captures the important elements of the real world environment in a manner which is specific to the current condition of the mobile user. A number of different context parameters can be used to indicate or discern the mobile context of a user. For example, the mobile context of a user may be determined from a combination of context parameters which indicate the time, position, location, situational context, social context, etc. of the mobile user. In fact, any piece of information that is relevant to the current state of the mobile user can be used as a context parameter to determine the mobile context of a user. The mobile context of a user is highly dynamic and will change as the environment of the user changes.

Mobile context could be implemented as a service on top of the sharing middleware 250 which can be utilized by all applications in the cloud. Consider the scenario where a mobile user who is waiting for a flight at an airport utilizes a mobile restaurant application which provides the user with a list of nearby restaurants. The restaurant application can utilize the mobile context service 610 to determine an appropriate set of restaurants to present to the user. For example, the restaurant application may utilize the mobile context service 610 to gather context parameters about the current environment of the user to tailor the list of restaurants which is presented to the user.

In this scenario, since the mobile user is located in an airport, it is likely that the mobile user will only be interested in those restaurants which are located in the same airport terminal. The mobile context service 610 may gather parameters indicating the location of the user using a global positioning system (GPS) application, thereby determining that the user is at the airport. In addition, the mobile context service 610 may gather parameters from an airline booking application which indicates the airline, terminal, and flight time of the user. Using these context parameters from the GPS application and the airline booking application, the restaurant application or the actual mobile context service 610 itself can determine the mobile context of the user. The list of restaurants presented to the user is based upon this mobile context. Thus, based on the mobile context of the user in this example, a list of restaurants may be presented to the user which only includes restaurants that are located in the specific terminal where the user is waiting for his flight.

As illustrated by the example above, the mobile context service 610 can provide a mobile application with mobile context information gathered from various other applications to permit the mobile application to tailor the information which is being presented to the user. In other words, a mobile application can adapt the information presented to a user in accordance with the mobile context of the user based on the information gathered from different mobile applications.

Applications can utilize mobile context via the mobile context service 610 to provide a rich experience to the user as demonstrated by the example provided in FIG. 1. Building a mobile context service 610 may involve extensive sharing between several mobile applications in order to provide information about a mobile user which is rich enough to capture the state of the user. For the purposes of simplicity, it can be assumed that the identity of the mobile user is the same across all the mobile applications hosted in a PaaS 600.

There are many issues that make it appropriate for the mobile context service 610 to be implemented as a separate service. For example, it is would be quite time-consuming for individual applications to query hundreds of shared datasets made available by all of the participating applications on the PaaS 600 in order to gather current information pertinent to a mobile user. It would be much more efficient if the applications could query a single service (i.e., the mobile context service 610) which is configured to aggregate all of the information available on a mobile user from the applications residing on the PaaS 600. For example, the mobile context service 610 could periodically retrieve updated position information for mobile users from maps and navigational applications, events from calendar or scheduling applications, social connections from social networking applications, etc. This is information can then be stored in one place and made accessible by the mobile context service 610.

Further benefits are associated with the fact that different applications may store data in different schema formats. Thus, a mobile context service 610 that provides the data in a consistent schema, while abstracting away the schema of the applications that contributed the data, would be very useful.

Figure 7:
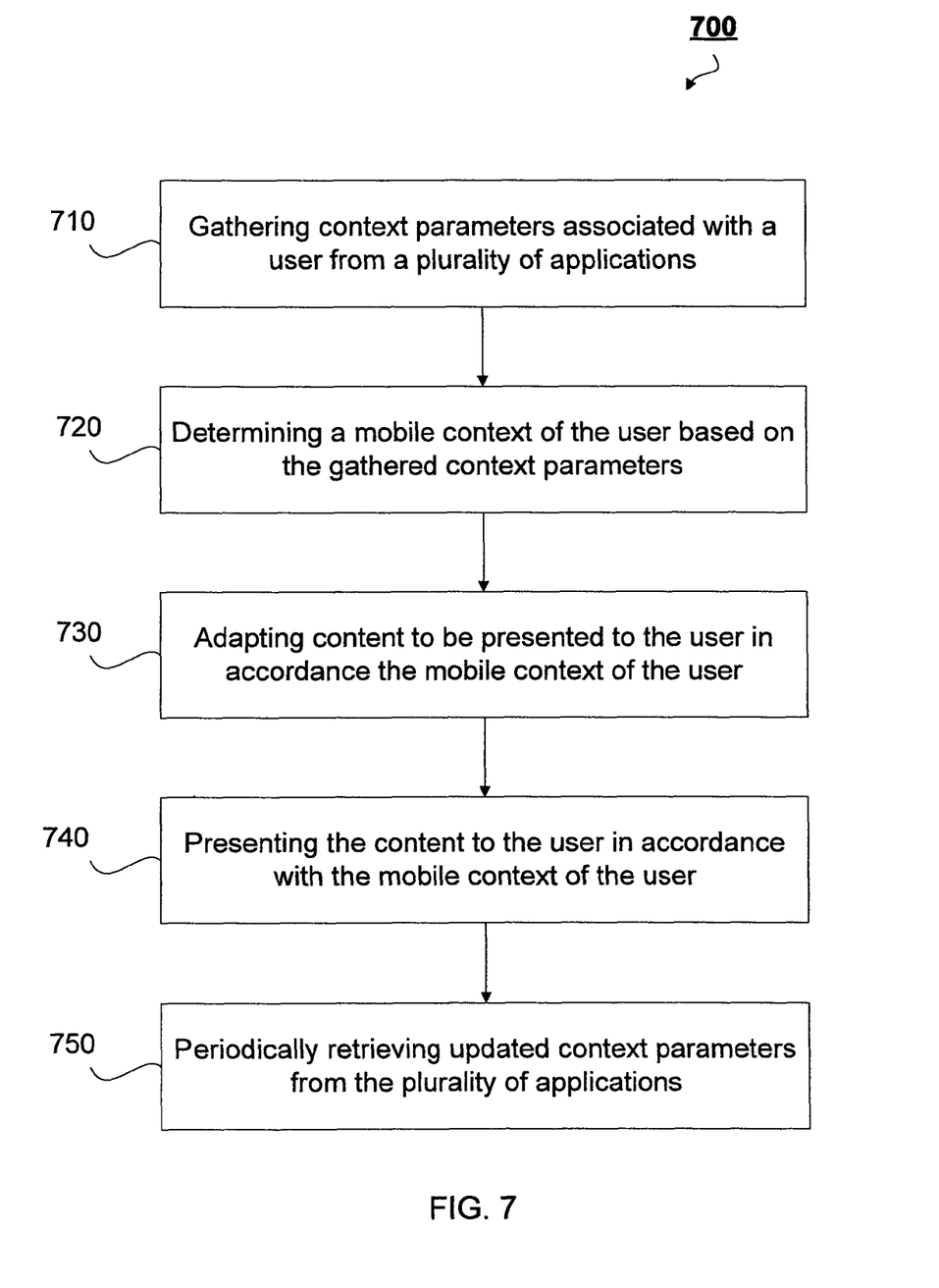
FIG. 7 is a block/flow diagram illustrating a method for providing a mobile context service in accordance with one embodiment of the present principles.

FIG. 7 illustrates an exemplary method 700 for providing a mobile context service 610. The method beings in block 710 where context parameters associated with a user from a plurality of applications are gathered. As explained above, the context parameters may indicate the location of the user, the social context of the user (e.g., whether the user is at a concert, attending a networking event, etc.), the time of day in the time zone in which the user is located, etc. In one embodiment, a mobile application can query other mobile applications directly to retrieve the context parameters. However, in a preferred embodiment, the context parameters are gathered by a centralized mobile context service 610 which is external to the mobile applications.

Next, in block 720, the mobile context of the user is determined based on the context parameters which have been gathered. The mobile context of the user may represent a snapshot of the user's environment (e.g., including location, time, social context, etc.) at a certain point in time.

In block 730, a mobile application adapts content which is to be presented to the user based on the mobile context of the user. The example discussed above involving the restaurant application indicates how a list of restaurants provided to a user can be adapted or customized based on the mobile context of the user.

After the content to be presented to the user is customized according to the mobile context of the user, the content is presented to the user via the mobile application (block 740). Since the mobile context of a user is highly dynamic and can change in time, the mobile context service 610 or the mobile application can query mobile applications for updated context parameters (block 750) to ensure that the mobile context of the user is periodically updated.

A recommendation service 620 may also be built on top of the PaaS which can provide support to mobile applications by offering recommendation features in the applications. One exemplary recommendation technique is referred to as "collaborative filtering". Collaborative filtering is based on finding users that are similar and providing recommendations based on the similarities between the users.

Figure 8:
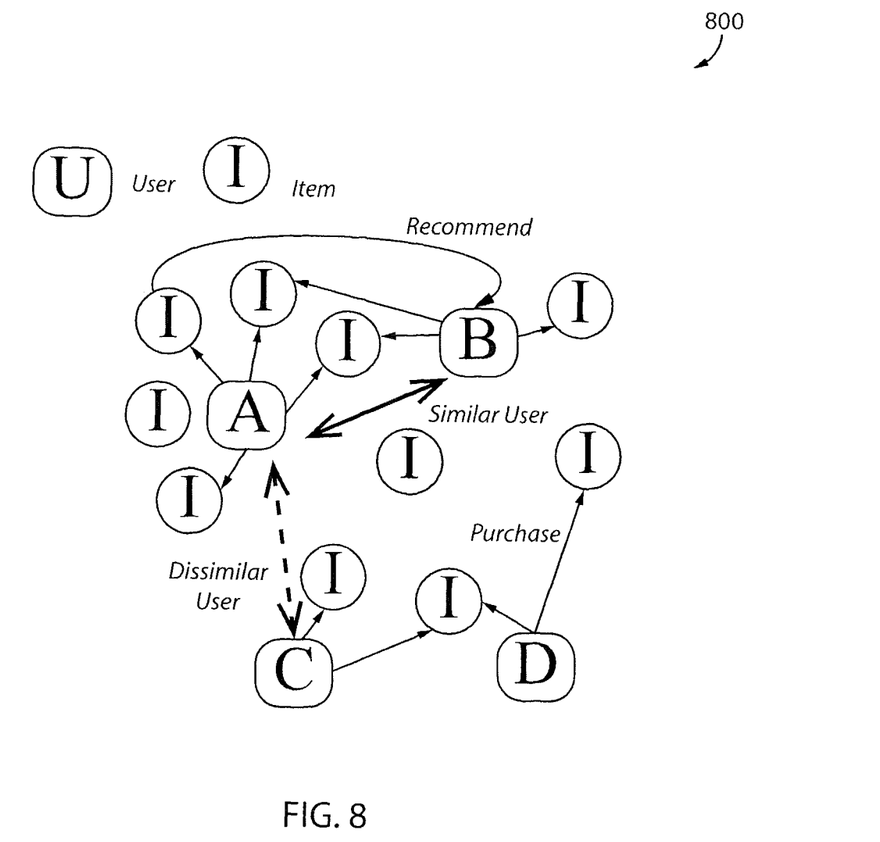
FIG. 8 is a block/flow diagram illustrating operation of a mobile application which utilizes the recommendation service depicted in FIG. 6.

For example, consider FIG. 8 which illustrates a shopping application 800 which utilizes the recommendation service 620 to provide recommendations to customers. Assume that the shopping application 800 maintains a database of its users and their purchase histories, and that two users are considered "similar", if their past purchases overlap significantly. A, B, C and D denote mobile users which utilize the shopping application 800. Each mobile user is associated with one or more items which have been purchased by the mobile user. The items are denoted by I.

In this example, the recommendation service 620 determines that A and B are similar users because of their purchases significantly overlap. Consequently, the recommendation service 620 may recommend items that B has purchased in the past to A assuming that A has not yet purchased the item. On the other hand, the recommendation service 620 also determines that A and C are dissimilar users. Therefore, the recommendation service 620 does not recommend items purchased by A to C, or vice versa.

Consider another example in which a movie ticket booking application stores information about the tickets purchased by mobile users, and a television streaming application stores television viewing preferences of mobile users. When a user of the TV application signs up with the movie application, the movie application can bootstrap the mobile user's preference by obtaining the similarity information with respect to users who utilize both services. That is, the mobile user's profile can be described as being similar to a set of mobile users, but dissimilar to another set of mobile users, such that the mobile users in both of the sets are those who already use both the applications. The recommendation service 620 could use the sharing middleware 250 to bootstrap a recommendation procedure by sharing user similarity information with one another.

Referring back to FIG. 6, a business analytics service 630 may also be included as part of the PaaS 600. The business analytics service 630 may provide a mobile application developer with a number of different useful tools. For example, the business analytics service 630 may provide an insight into the desires of their client base, determine the performance of a mobile application, identify new potential clients, provide back-end support services, and indicate features of a mobile application which are inadequate or which need to be updated. To provide these tools to a developer, business analytics service 630 may utilize the sharing middleware 250 to access analytical information (e.g., server usage, memory usage, CPU usage, number of client queries, etc.), payment information or other business-related information associated with one or more mobile applications.

It should be recognized that the present principles are not limited to the particular services 610, 620 and 630 described above. Rather, numerous other types of services may also be built on top of the PaaS 600 in accordance with the present principles.

Having described preferred embodiments of a system and method for providing mobile computing services (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for data sharing, comprising:
   a data store residing on a cloud platform;
   a sharing negotiation tool to automatically facilitate a three-way sharing agreement to be reached among an application that shares data (a "data owner"), an application which wants access to data from the data owner (a "data consumer"), and the cloud platform, wherein the owner sets one or more flags which indicate a particular portion or subset of data available for sharing, as well as the data not available for sharing; and
   a uniform communication framework executed by a processor and provided as part of a sharing service on the cloud platform to facilitate data sharing among a plurality of applications, the uniform communication framework including an application programming interface (API) which provides a communication gateway which permits a first application to access data of a second application stored in the data store.

2. The system as recited in claim 1, wherein the first application issues a data sharing request to the API to access the data of the second application.

3. The system as recited in claim 1, further comprising a query processing engine configured to translate a data sharing request received by the API from the first application and schedule the data sharing request for execution on a data store at the cloud platform.

4. The system as recited in claim 1, wherein the second application is a tenant application hosted on the cloud platform and the first application is a consumer application which is not hosted on the cloud platform.

5. The system as recited in claim 1, wherein the first application and second application are both tenant applications hosted on the cloud platform.

6. The system as recited in claim 1, wherein the uniform communication framework permits a data owner application to share data with a plurality of consumer applications by processing data sharing requests received from the consumer applications via the API on the cloud platform.

7. The system as recited in claim 5, wherein the data store stores underlying data of at least the second application.

8. The system as recited in claim 1, wherein the uniform communication framework utilizes a single protocol which permits applications to access data stored in a data store in a uniform manner.

9. A method for data sharing, comprising:
   issuing a data sharing request from a first application executed by a processor via an application programming interface (API) implemented on a cloud platform using a sharing negotiation tool to automatically facilitate a three-way sharing agreement to be reached among an application that shares data (a "data owner"), an application which wants access to data from the data owner (a "data consumer"), and the cloud platform, wherein the owner sets one or more flags which indicate a particular portion or subset of data available for sharing, and data not available for sharing; and
   processing the request to provide the first application with access to data of a second mobile application.

10. The method as recited in claim 9, wherein the first application issues a data sharing request to the API to access the data of the second application.

11. The method as recited in claim 9, wherein the data sharing request includes one of a request to read the data of the second application or an update to the data of the second application.

12. The method as recited in claim 9, further comprising translating a data sharing request received by the API from the first application and scheduling the data sharing request for execution on a data store at the cloud platform.

13. The method as recited in claim 9, wherein the second application is a tenant application hosted on the cloud platform and the first application is a consumer application which is not hosted on the cloud platform.

14. The method as recited in claim 9, wherein the first application and second application are both tenant applications hosted on the cloud platform.

15. The method as recited in claim 9, wherein the uniform communication framework permits a data owner application to share data with a plurality of consumer applications by processing data sharing requests received from the consumer applications via the API on the cloud platform.

16. The method as recited in claim 9, further comprising storing the underlying data of at least the second application in a data store on the cloud platform.

17. The method as recited in claim 9, wherein the API utilizes a single protocol to permit applications to access data in a data store in a uniform manner.

18. A system for data sharing, comprising:
   a uniform communication framework executed by a processor and implemented on a cloud platform to facilitate data sharing among a plurality of mobile applications, the uniform communication framework comprising:
   a uniform protocol which permits the mobile applications to access underlying data of data owning applications residing on the cloud platform in a uniform manner;
   a sharing negotiation tool to automatically facilitate a three-way sharing agreement to be reached among an application that shares data (a "data owner"), an application which wants access to data from the data owner (a "data consumer"), and the cloud platform, wherein the owner sets one or more flags which indicate a portion or subset of data available for sharing, and data not available for sharing; and
   an application programming interface (API) which is configured to receive data sharing requests from consumer applications using the uniform protocol and provide the consumer applications with access to the underlying data.

19. The system as recited in claim 18, wherein the consumer applications issue data sharing requests to access the data of the data owning application, the data sharing requests including one of a request to read the data of the data owning application or an update to the data of the data owning application.

* * * * *